US008280618B2

(12) United States Patent
Feyereisen et al.

(10) Patent No.: US 8,280,618 B2
(45) Date of Patent: Oct. 2, 2012

(54) METHODS AND SYSTEMS FOR INPUTTING TAXI INSTRUCTIONS

(75) Inventors: Thea L. Feyereisen, Hudson, WI (US); John G. Suddreth, Cave Creek, AZ (US); Troy Nichols, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/703,491

(22) Filed: Feb. 10, 2010

(65) Prior Publication Data

US 2011/0196599 A1 Aug. 11, 2011

(51) Int. Cl.
*G06G 7/76* (2006.01)
*G05D 1/00* (2006.01)
*G06F 19/00* (2006.01)

(52) U.S. Cl. ......................... 701/120; 701/419; 701/431

(58) Field of Classification Search .................... 701/14, 701/207, 208, 212, 120, 419, 431, 432, 443, 701/488, 516, 539, 540; 340/947, 948, 950, 340/951, 958, 972, 982
See application file for complete search history.

(56) References Cited

U.S. PATENT DOCUMENTS

| | | | | |
|---|---|---|---|---|
| 3,706,969 | A * | 12/1972 | Paredes | 340/989 |
| 5,844,503 | A | 12/1998 | Riley et al. | |
| 6,694,249 | B1 * | 2/2004 | Anderson et al. | 701/120 |
| 6,751,545 | B2 * | 6/2004 | Walter | 701/120 |
| 6,862,519 | B2 * | 3/2005 | Walter | 701/120 |
| 7,222,017 | B2 * | 5/2007 | Clark et al. | 701/120 |
| 7,343,229 | B1 * | 3/2008 | Wilson | 701/15 |
| 7,567,187 | B2 * | 7/2009 | Ramaiah et al. | 340/945 |
| 7,623,044 | B2 * | 11/2009 | Pepitone et al. | 340/950 |
| 7,630,829 | B2 * | 12/2009 | Pepitone | 701/120 |
| 7,755,516 | B2 * | 7/2010 | Clark et al. | 340/961 |
| 7,813,845 | B2 * | 10/2010 | Doose et al. | 701/16 |
| 2003/0105579 | A1 * | 6/2003 | Walter | 701/120 |
| 2004/0006412 | A1 * | 1/2004 | Doose et al. | 701/10 |
| 2005/0190079 | A1 * | 9/2005 | He | 340/945 |
| 2005/0283305 | A1 * | 12/2005 | Clark et al. | 701/120 |
| 2007/0241935 | A1 * | 10/2007 | Pepitone et al. | 340/958 |
| 2007/0241936 | A1 * | 10/2007 | Arthur et al. | 340/958 |
| 2008/0042880 | A1 * | 2/2008 | Ramaiah et al. | 340/958 |
| 2008/0106438 | A1 * | 5/2008 | Clark et al. | 340/972 |
| 2009/0051570 | A1 * | 2/2009 | Clark et al. | 340/971 |
| 2009/0157300 | A1 * | 6/2009 | Clark et al. | 701/204 |
| 2009/0157303 | A1 * | 6/2009 | Clark et al. | 701/207 |
| 2009/0306887 | A1 * | 12/2009 | Clark et al. | 701/202 |
| 2010/0017105 | A1 * | 1/2010 | Pepitone et al. | 701/120 |
| 2010/0125403 | A1 * | 5/2010 | Clark et al. | 701/120 |
| 2010/0324807 | A1 * | 12/2010 | Doose et al. | 701/120 |

* cited by examiner

*Primary Examiner* — Khoi Tran
*Assistant Examiner* — Jason Holloway
(74) *Attorney, Agent, or Firm* — Ingrassia, Fisher & Lorenz, P.C.

(57) ABSTRACT

Methods and systems are provided for providing information relating to taxiing an aircraft at an airport having a plurality of taxi paths. One exemplary method involves identifying a first aircraft location on a first taxi path and a first aircraft heading along the first taxi path, and determining a first subset of possible taxi paths from the plurality of taxi paths based on the first aircraft location and the first aircraft heading, such that each respective taxi path of the first subset intersects the first taxi path at a respective intersection location in the first aircraft heading from the first aircraft location. The method continues by receiving a first input, and when the first input corresponds to a second taxi path of the first subset, providing indication of the second taxi path.

17 Claims, 5 Drawing Sheets

METHODS AND SYSTEMS FOR INPUTTING TAXI INSTRUCTIONS

TECHNICAL FIELD

The subject matter described herein relates generally to avionics, and more particularly, embodiments of the subject matter relate to avionics systems and related cockpit displays adapted for indicating received taxi instructions to a user.

BACKGROUND

Taxi instructions, also referred to as a taxi clearance, provide a specific route comprising a sequence of taxiways, runways, or segments thereof, which an aircraft (or another vehicle) should follow when traversing between to locations on the ground (e.g., between terminals, hangars and/or runways) to avoid confusion and/or runway incursions or to otherwise maintain safe and organized ground traffic flow. Taxi instructions are typically received by a pilot from an air-traffic controller immediately prior to taxiing the aircraft, for example, from a terminal and/or hangar to a runway for departure, from a runway to a terminal and/or hangar after landing, or to otherwise taxi the aircraft clear of a runway.

Traditionally, pilots were responsible for maintaining an up-to-date paper chart, known as an airport diagram, which provides a map or layout of the runways, taxiways, terminals and/or hangars for each airport where the aircraft is expected to be operated. After receiving taxi instructions at an airport, the pilot would manually record the taxi instructions (e.g., by writing them down on a piece of paper) and then utilize the paper chart corresponding to that airport to navigate the aircraft about the airport in accordance with the received taxi instructions. This undesirably increases a pilot's workload and distracts the pilot's focus and/or attention on operating the aircraft, and thus, degrades the pilot's situational awareness. Additionally, larger airports typically have a large number of taxiways, runways, terminals and/or hangars, potentially resulting in more complex taxi instructions, which in combination with an increasing amount of ground traffic, further increases the demand on a pilot.

BRIEF SUMMARY

A method is provided for providing information relating to taxiing an aircraft at an airport having a plurality of taxi paths. The method comprises identifying a first aircraft location corresponding to a location on a first taxi path of the plurality of taxi paths and identifying a first aircraft heading corresponding to a heading of the aircraft along the first taxi path at the first aircraft location. The method further comprises determining a first subset of the plurality of taxi paths based on the first aircraft location and the first aircraft heading, wherein each respective taxi path of the first subset of the plurality of taxi paths intersects the first taxi path at a respective intersection location in a direction substantially aligned with the first aircraft heading from the first aircraft location. The method further comprises receiving a first input and providing indication of a second taxi path of the first subset of taxi paths when the first input corresponds to the second taxi path.

In another embodiment, a system for an aircraft is provided. A system for an aircraft comprises a data storage element, a user input device, and processing system coupled to the data storage element and the user input device. The data storage element maintains information pertaining to a plurality of taxi paths for an airport. The processing system is configured to obtain a first aircraft location corresponding to a location of the aircraft on a first taxi path of the plurality of taxi paths, obtain a first aircraft heading corresponding to a heading of the aircraft along the first taxi path at the first aircraft location, and determine a first subset of the plurality of taxi paths, wherein each taxi path of the first subset intersects the first taxi path in a direction substantially aligned with the first aircraft heading from the first aircraft location. The processing system is further configured to identify a second taxi path from among the first subset based on an input received from the user input device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

Figure 1:
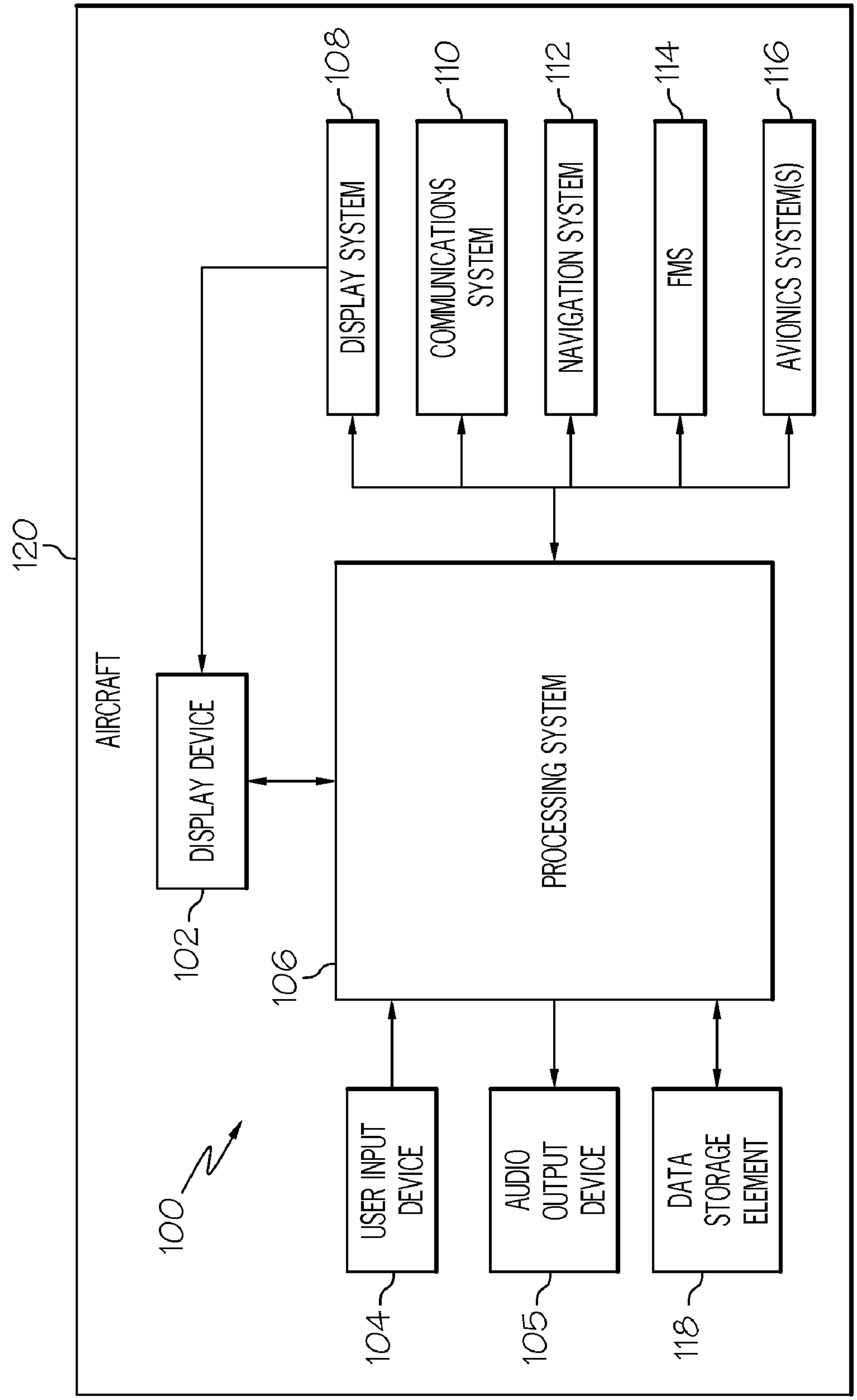
FIG. 1 is a block diagram of a system suitable for use in an aircraft in accordance with one embodiment.

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, speech and/or voice recognition, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to systems adapted to allow a user to input an assigned taxi clearance (or taxi instructions). The possible taxiways and/or runways allowable as an input are limited based on the current and/or previously identified taxiway and/or runway and the aircraft's heading and location along the current and/or previously identified taxiway and/or runway. As a result, the number of possible options is reduced, thereby simplifying the task of inputting the next desired taxiway and/or runway and reducing the workload on a user. The taxi instructions may be displayed in connection with a map of the particular airport on a display device onboard the aircraft, in a manner that allows the user to easily review and execute the taxi instructions. Although the subject matter is described herein in the context of an aircraft, it should be understood that the subject matter may be similarly utilized with any vehicle being utilized for ground transportation about an airport (e.g., a refueling truck, a maintenance vehicle, or another ground support vehicles), and the subject matter described herein is not intended to be limited to any particular vehicle or vessel.

FIG. 1 depicts an exemplary embodiment of a system 100, which may be located onboard a vehicle such as an aircraft 120. In an exemplary embodiment, the system 100 includes, without limitation, a display device 102, a user input device 104, an audio output device 105, a processing system 106, a display system 108, a communications system 110, a navigation system 112, a flight management system (FMS) 114, one or more avionics systems 116, and a data storage element 118 suitably configured to support operation of the system 100, as described in greater detail below. It should be understood that FIG. 1 is a simplified representation of a system 100 for purposes of explanation and ease of description, and FIG. 1 is not intended to limit the application or scope of the subject matter in any way. Practical embodiments of the system 100 and/or aircraft 120 will include numerous other devices and components for providing additional functions and features, as will be appreciated in the art. In this regard, although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). A practical embodiment of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, an electronic flight bag and/or another suitable avionics system.

In an exemplary embodiment, the display device 102 is coupled to the display system 108. The display system 108 is coupled to the processing system 106, and the processing system 106 and the display system 108 are cooperatively configured to display, render, or otherwise convey one or more graphical representations or images associated with operation of the aircraft 120 on the display device 102, as described in greater detail below. The processing system 106 is coupled to the navigation system 112 for obtaining real-time navigational data and/or information regarding operation of the aircraft 120 to support operation of the system 100. In an exemplary embodiment, the communications system 110 is coupled to the processing system 106 and configured to support communications to and/or from the aircraft 120, as will be appreciated in the art. The processing system 106 is also coupled to the flight management system 114, which in turn, may also be coupled to the navigation system 112, the communications system 110, and one or more additional avionics systems 118 to support navigation, flight planning, and other aircraft control functions in a conventional manner, as well as to provide real-time data and/or information regarding operation of the aircraft 120 to the processing system 106. In an exemplary embodiment, the user input device 104 is coupled to the processing system 106, and the user input device 104 and the processing system 106 are cooperatively configured to allow a user to interact with the display device 102 and other elements of system 100, as described in greater detail below. The audio output device 105 is coupled to the processing system 106, and the audio output device 105 and the processing system 106 are cooperatively configured to provide auditory feedback to a user, as described in greater detail below.

In an exemplary embodiment, the display device 102 is realized as an electronic display configured to graphically display flight information or other data associated with operation of the aircraft 120 under control of the display system 108 and/or processing system 106. In an exemplary embodiment, the display device 102 is located within a cockpit of the aircraft 120. It will be appreciated that although FIG. 1 shows a single display device 102, in practice, additional display devices may be present onboard the aircraft 120. In an exemplary embodiment, the user input device 104 is also located within the cockpit of the aircraft 120 and adapted to allow a user (e.g., pilot, co-pilot, or crew member) to interact with the system 100, as described in greater detail below. In various embodiments, the user input device 104 may be realized as a keypad, touchpad, keyboard, mouse, touch panel (or touch screen), joystick, knob, line select key or another suitable device adapted to receive input from a user. In accordance with one or more embodiments, the user input device 104 is realized as an audio input device, such as a microphone, audio transducer, audio sensor, or the like, that is adapted to allow a user (e.g., pilot, co-pilot, or crew member) to provide audio input to the system 100 in a "hands free" manner without requiring a user to move his or her hands and/or head to interact with the system, as described in greater detail below. In various embodiments, the audio output device 105 may be realized as a speaker, headphone, earphone, earbud, or another suitable device adapted to provide auditory output to a user. In this regard, in some embodiments, the audio input device 104 and audio output device 105 may be integrated on a single headset, as will be appreciated in the art. It should be appreciated that although FIG. 1 shows the display device 102, the audio input device 104, and the audio output device 105 as being located within the aircraft 120, in practice, one or more of the display device 102, the audio input device 104, and/or the audio output device 105 may be located outside the aircraft 120 (e.g., on the ground as part of an air traffic control center or another command center) and communicatively coupled to the remaining elements of the system 100 (e.g., via a data link).

In an exemplary embodiment, the navigation system 112 is configured to obtain one or more navigational parameters associated with operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position (or ownship position) of the aircraft 120, that is, the current location of the aircraft 120 (e.g., the latitude and longitude) and the altitude or above ground level for the aircraft 120. In an exemplary embodiment, the navigation system 112 also obtains and/or determines the heading of the aircraft 120 (i.e., the direction the aircraft is traveling in relative to some reference). In an exemplary embodiment, the communications system 110 is suitably configured to support communications between the aircraft 120 and air traffic control or another suitable command center or ground location. In this regard, the communications system 110 may be realized using a radio communication system or another suitable data link system. In an exemplary embodiment, the flight management system 114 maintains information pertaining to a flight plan (or alternatively, a route or travel plan) for the aircraft 120. In accordance with one or more embodiments, the flight management system 114 also maintains information regarding operating characteristics of the aircraft 120, such as, for example, the turning radius of the aircraft 120, the wingspan of the aircraft 120, the gross weight of the aircraft 120, and the like. In an exemplary embodiment, the avionics system 116 includes an automated system adapted to provide auditory guidance and/or warnings to a user via audio output device 105 when taxiing, as described in greater detail below.

The display system 108 generally represents the hardware, software, and/or firmware components configured to control the display and/or rendering of one or more navigational maps and/or other displays pertaining to operation of the aircraft 120 and/or systems 112, 114, 116, 118 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying content on the display device 102.

The processing system 106 generally represents the hardware, software, and/or firmware components configured to facilitate communications and/or interaction between the user input device 104 and the other elements of the system 100 and perform additional tasks and/or functions described in greater detail below. In an exemplary embodiment, the processing system 106 implements a speech recognition engine (or voice recognition engine) and/or speech-to-text system adapted to receive audio input from a user via an audio input device 104. In this regard, the processing system 106 also includes one or more analog-to-digital converters (ADCs), digital-to-analog converters (DACs), analog filters and/or digital filters suitably configured to support operations of the system 100, as described in greater detail below.

Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof.

In an exemplary embodiment, the data storage element 118 maintains information regarding the taxi paths (or taxi routes) for one or more airports or another suitable ground location. As used herein, a taxi path or taxi route should be understood as a delineated path for travel on the ground, such as a taxiway, runway, or another suitable ground travel path at an airport. In an exemplary embodiment, each airport is associated with a plurality of taxi paths for traveling between the hangars, terminals, aprons, ramp areas, parking stands, deicing stands and/or runways at the respective airport. In this regard, the data storage element 118 maintains an association between a respective airport and the taxi paths located at that respective airport. In an exemplary embodiment, the data storage element 118 maintains geographic information pertaining to the taxi paths at the respective airport, such as, for example, the geographic location of the endpoints of the taxiways and/or runways, identifiers for the respective taxiways and/or runways, identification of the taxiways and/or runways that intersect, cross or otherwise connect to another taxiway and/or runway, the geographic location of the intersections of taxiways and/or runways, or other information relating to the relationship between a respective taxiway and/or runway and the other taxiways and/or runways at the airport.

Figure 2:
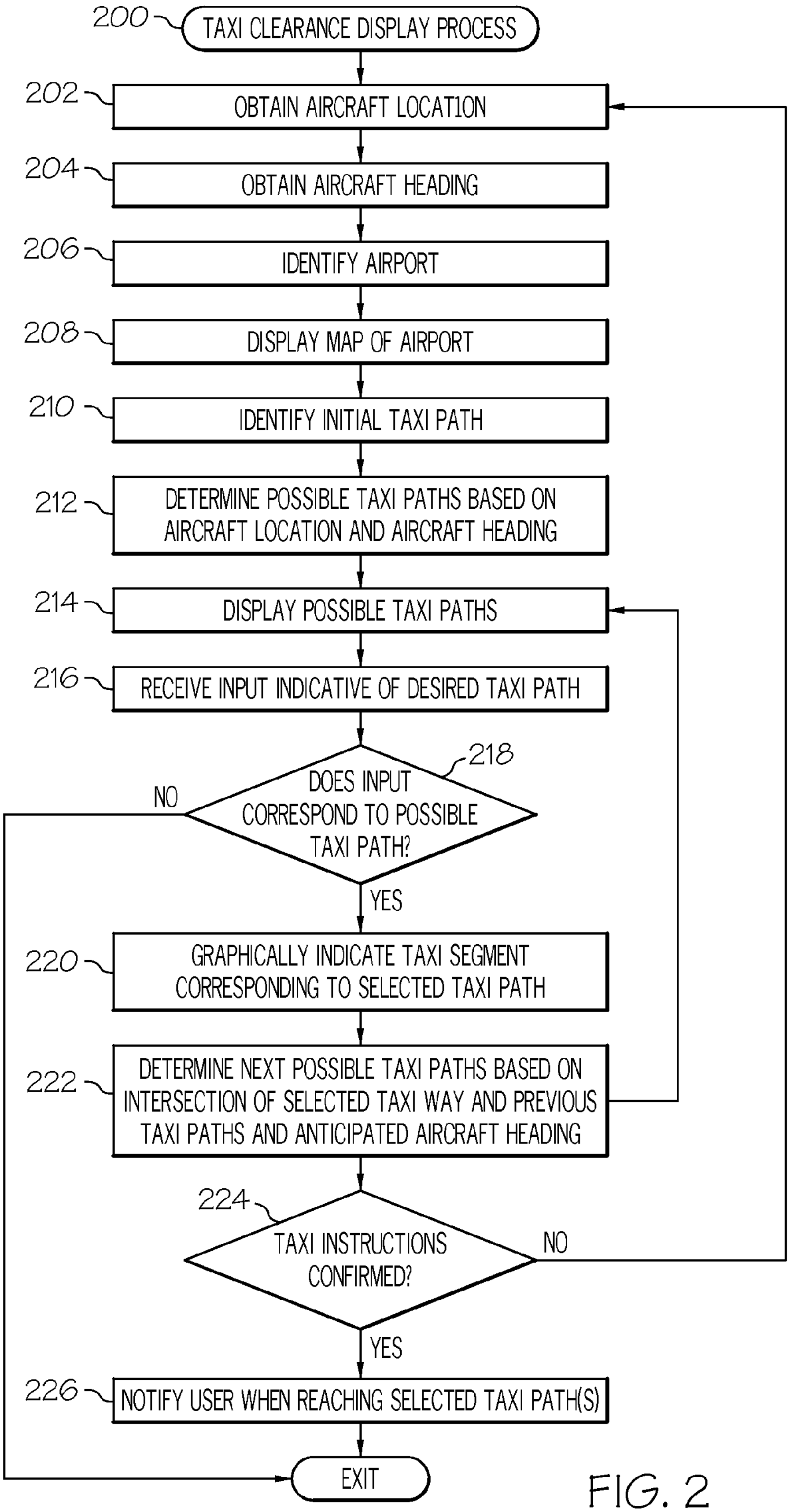
FIG. 2 is a flow diagram of an exemplary taxi clearance display process suitable for use with the system of FIG. 1 in accordance with one embodiment.

Referring now to FIG. 2, in an exemplary embodiment, a system 100 may be configured to perform a taxi clearance display process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the audio input device 104, the audio output device 105, the processing system 106, the display system 108, an avionics system 110, 112, 114, 116 and/or the data storage element 118. It should be appreciated that any number of additional or alternative tasks may be included, and may be incorporated into a more comprehensive procedure or process having additional functionality not described in detail herein.

Referring again to FIG. 2, and with continued reference to FIG. 1, a taxi clearance display process 200 may be performed to enable a user, such as a pilot or co-pilot, to quickly and easily input a taxi clearance (or taxi instructions) which may then be subsequently displayed on a display device and/or provided to an automated system to give feedback to the user. In an exemplary embodiment, the taxi clearance display process 200 begins by obtaining or otherwise identifying the location and heading of the aircraft (tasks 202, 204). Depending on the embodiment, the processing system 106 may obtain or otherwise identify the location of the aircraft 120 (or ownship position) based on information provided by the navigation system 112, flight management system 114, or another avionics system 116. In an exemplary embodiment, the processing system 106 obtains or otherwise identify the heading (or bearing) of the aircraft 120 based on information received from the navigation system 112. For example, in accordance with one embodiment, the navigation system 112 provides the geographic location of the aircraft 120 (e.g., latitude and longitude coordinates or other GPS coordinates corresponding to the location of the aircraft 120) as well as the heading (or bearing) of the aircraft 120 to the processing system 106.

In an exemplary embodiment, the taxi clearance display process 200 continues by identifying or otherwise determining the airport which the aircraft is currently located at (or proximate to) and displaying a navigational map of the identified airport in a viewing area on a display device associated with the aircraft (tasks 206, 208). Depending on the embodiment, the processing system 106 may identify the appropriate airport based on the location of the aircraft 120, by obtaining the appropriate airport from the flight management system 114 (e.g., based on the flight plan), or the appropriate airport may be identified in response to receiving user input indicative of the airport which the aircraft 120 is located at and/or proximate to via user input device 104.

Figure 3:
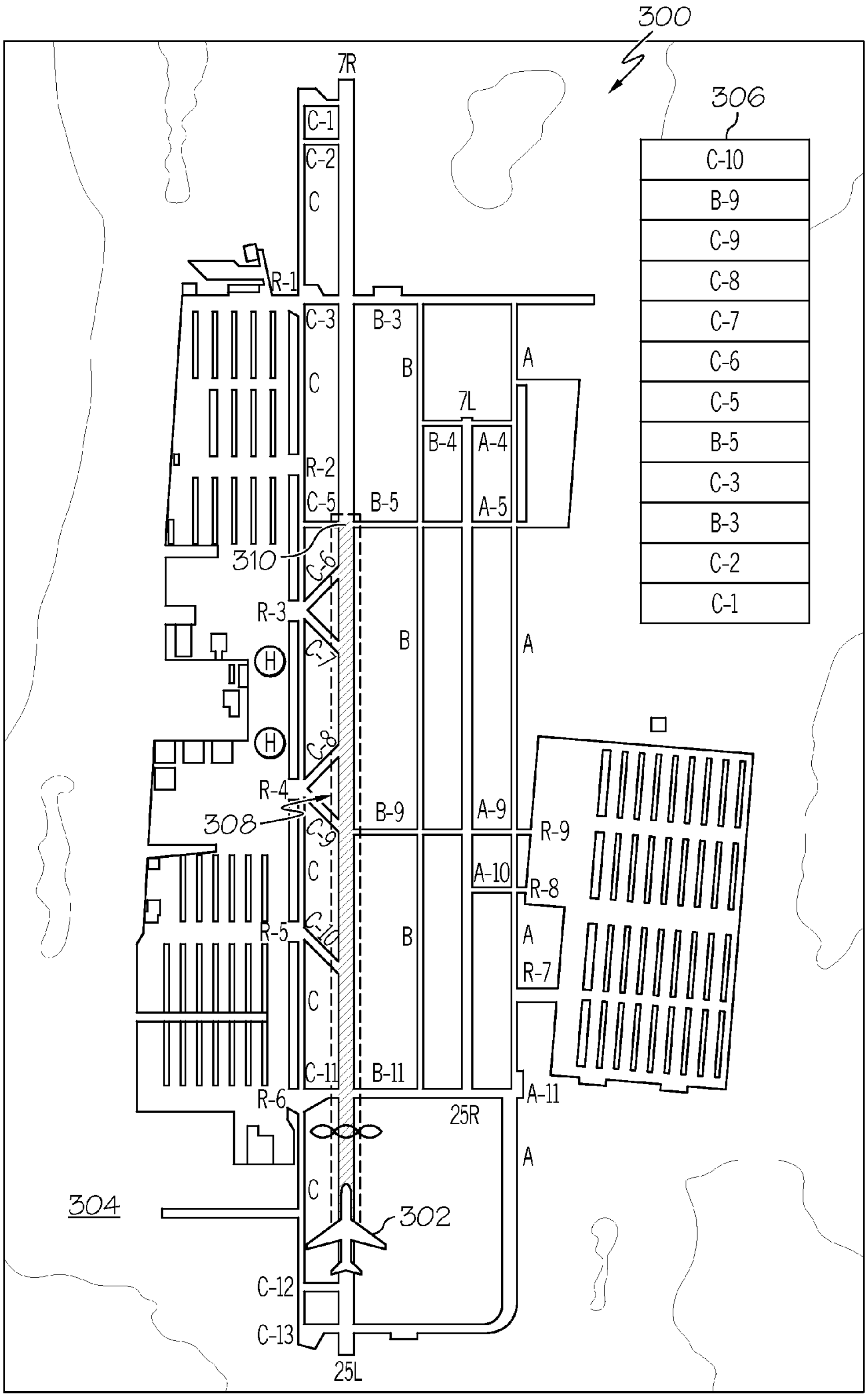
FIG. 3 depicts an exemplary navigational map suitable for use with the taxi clearance display process of FIG. 2 in accordance with one embodiment.

Referring now to FIG. 3, and with continued reference to FIG. 1 and FIG. 2, the taxi clearance display process 200 may display and/or render a navigational map 300 of the identified airport on the display device 102 in the aircraft 120. In this regard, the background 304 of the navigational map 300 comprises a graphical representation of the taxiways, runways, hangars and/or terminals for the identified airport. In this regard, the processing system 106 and/or display system 108 display and/or render the background 304 of the navigational map 300 based at least in part on information maintained by data storage element 118. In an exemplary embodiment, the taxi clearance display process 200 also displays and/or renders a graphical representation of the aircraft 302 within the navigational map 300. In this regard, the graphical representation of the aircraft 302 is overlaid or rendered on top of a background 304 and positioned with respect to the background 304 in a manner that accurately reflects the real-world location and/or heading of the aircraft 302. In an exemplary embodiment, the navigational map 300 is refreshed or updated as the aircraft travels, such that the graphical representation of the aircraft 302 is positioned with respect to background 304 in a manner that accurately reflects the current (e.g., instantaneous or substantially real-time) real-world location and/or heading of the aircraft 120 relative to the earth. In the illustrated embodiment shown in FIG. 3, the orientation of the navigational map 300 is track-up or heading-up (i.e., aligned such that the aircraft 302 is always traveling in an upward direction). However, it will be appreciated that in other embodiments, the orientation of the navigational map 300 may be north-up (i.e., moving upward on the map 300 corresponds to traveling northward) or with respect to another direction (e.g., east-up), and the subject matter described herein is not limited to any particular orientation of the navigational map 300.

It should be understood that FIG. 3 is a simplified representation of a navigational map 300, and practical embodiments may include the terrain, topology, airspace designations and/or restrictions, points of interest, weather conditions, radar data, neighboring air traffic, and/or other real-time flight related information or items within the geographic area corresponding to the currently displayed area of the navigational map 300, as will be appreciated in the art. Furthermore, it will be appreciated that although FIG. 3 depicts a top view (e.g., from above the aircraft 302) of the navigational map 300, in practice, alternative embodiments may utilize various perspective views, such as side views, three-dimensional views (e.g., a three-dimensional synthetic vision display), angular or skewed views, and the like.

Referring again to FIG. 2, and with continued reference to FIG. 1 and FIG. 3, in an exemplary embodiment, the taxi clearance display process 200 continues by identifying the initial taxi path (or taxi route) for the aircraft (task 210). In accordance with one embodiment, the initial taxi path comprises the runway or taxiway which the aircraft is currently located on, that is, the taxiway or runway corresponding to the obtained aircraft location. The processing system 106 may identify or otherwise determine the initial taxi path for the aircraft 120 based on the obtained aircraft location and/or the obtained aircraft heading, and the geographic location information for the runways and/or taxiways maintained by the data storage element 118. For example, referring now to FIG. 3, the processing system 106 may identify runway 25L as the initial taxi path for the aircraft 120 when the geographic location of the aircraft 120 is between the endpoints for runway 25L/7R and the heading of the aircraft 120 corresponds to runway 25L. In accordance with another embodiment, when the aircraft is not currently located on a runway and/or taxiway, the taxi clearance display process 200 may identify or otherwise determine the initial taxi path as the anticipated starting runway and/or taxiway for taxiing the aircraft (e.g., the runway which the aircraft 120 is expect to land on and/or the taxiway nearest the current gate). For example, the processing system 106 may identify the initial taxi path for the aircraft 120 based on the assigned and/or designated runway for landing, by obtaining such information from the flight management system 114. In another embodiment, the processing system 106 may identify the initial taxi path for the aircraft 120 based on taxiway nearest to and/or connecting to the current gate, terminal and/or hangar where the aircraft 120 is located, for example, based on the aircraft location and the geographic information for the runways and/or taxiways maintained by the data storage element 118. Alternatively, initial taxi path may be obtained by the processing system 106 from a user via user input device 104.

In an exemplary embodiment, after identifying the initial taxi path for the aircraft, the taxi clearance display process 200 continues by determining or otherwise identifying a plurality of possible taxi paths corresponding to the next possible taxi paths for the aircraft (task 212). In this regard, the next possible taxi paths comprises a subset of the plurality of taxi paths for the identified airport which are capable of being utilized by the aircraft 120. In an exemplary embodiment, each possible taxi path of the plurality of possible taxi paths intersects crosses, or otherwise meets the initial taxi path at a respective intersection location that is in a direction substantially aligned with the aircraft heading from the aircraft location along the initial taxi path. In this regard, each possible taxi path intersects, crosses, or otherwise meets the initial taxi path at an intersection location between the aircraft's location on the initial taxi path and the endpoint of the initial taxi path in the direction of the aircraft's travel (e.g., in front of or ahead of the aircraft) from the aircraft's location on the initial taxi path. In other words, the next possible taxi paths do not include taxiways and/or runways which intersect, cross, or otherwise meet the initial taxi path in the opposite direction of the aircraft's heading from the aircraft location (e.g., taxi paths that intersect and/or cross the initial taxi path behind the aircraft's location) or taxiways and/or runways that do not intersect, cross, or otherwise connect to the initial taxi path. Thus, the taxi clearance display process 200 excludes taxi paths of the plurality of taxi paths at the identified airport that either do not intersect the initial taxi path or intersect the initial taxi path in a direction opposite the aircraft heading (e.g., behind the aircraft location) from the possible taxi paths.

In an exemplary embodiment, the plurality of possible taxi paths does not include taxiways and/or runways which the aircraft 120 is physically incapable of utilizing based on one or more operating characteristics of the aircraft 120, such as, the current velocity of the aircraft 120, the turning radius of the aircraft 120, the wingspan of the aircraft 120, the gross weight of the aircraft 120, or another characteristic of the aircraft 120. For example, the processing system 106 may exclude a taxi path that intersects the initial taxi path in the direction of the aircraft heading from the aircraft's location from the next possible taxi paths based upon a relationship of the current velocity of the aircraft 120 and the distance between the taxi path and the aircraft location. For example, if the distance between the taxi path and the aircraft location is insufficient for the aircraft 120 to be able to reduce its velocity to a maximum safe velocity for turning onto or otherwise accessing the taxi path, the processing system 106 may exclude the taxi path from the plurality of taxi paths. In another embodiment, the processing system 106 may exclude a taxi path that intersects the initial taxi path in the direction of the aircraft heading from the aircraft's location from the next possible taxi paths based upon the angle of intersection between the taxi path and the initial taxi path and the turning radius of the aircraft 120. In this regard, if the turning radius of the aircraft 120 is too large for the aircraft 120 to be able to turn or otherwise maneuver onto the taxi path, the processing system 106 may exclude the taxi path from the plurality of taxi paths. In alternative embodiments, if the wingspan and/or gross weight of the aircraft 120 are too large for the aircraft 120 to be able to utilize the taxi path, the processing system 106 may exclude the taxi path from the plurality of taxi paths. For example, a particular taxi path may have weight and/or wingspan restrictions, wherein the taxi path is excluded from the possible taxi paths when the gross weight and/or wingspan of the aircraft 120 exceeds the weight and/or wingspan restrictions for the particular taxi path. Thus, a larger aircraft may have fewer possible taxi paths than a smaller aircraft.

In an exemplary embodiment, the taxi clearance display process 200 determines the next possible taxi paths for the aircraft based on the initial taxi path, the aircraft location, the aircraft direction the aircraft is traveling on the initial taxi path, and the velocity at which the aircraft is traveling on the initial taxi path. For example, referring now to the embodiment illustrated in FIG. 3, the processing system 106 may determine the next possible taxi paths for the aircraft 120, 302 by identifying the taxi paths which intersect the current taxi path (e.g., runway 25L) in the forward direction from (or in front of or ahead of) the aircraft 120, 302 based on the aircraft's location and heading along the current taxi path using the information for the taxi paths (e.g., the geographic locations of the taxi paths and/or intersection information) at the identified airport maintained by data storage element 118. The processing system 106 may then obtain the velocity of the aircraft 120, 302 and exclude any of the taxi paths which intersect the current taxi path (e.g., runway 25L) in the forward direction from the aircraft 120, 302 which the aircraft 120, 302 is incapable of utilizing based on the aircraft's velocity, the maximum safe aircraft velocity for turning onto the respective taxi path (e.g., based on the angle at which the respective taxi path intersects the current taxi path), and the distance between the aircraft's current location and the respective taxi path. For example, if the distance between the aircraft's current location and a taxi path in the forward direction of the aircraft is insufficient for the aircraft to reduce its velocity from its current velocity to the maximum safe aircraft velocity for turning onto the respective taxi path, the processing system 106 may exclude the taxi path from the next possible taxi paths. For example, in FIG. 3, the velocity of the aircraft 302 may be such that the aircraft 302 is incapable of turning onto either of taxiway C-11 or B-11, which intersect runway 25L in the forward direction, wherein the processing system 106 excludes taxiways C-11 and B-11 from the next possible taxiways for the aircraft 302. Alternatively, the processing system 106 may exclude taxiway C-11 and/or taxiway B-11 from the next possible taxiways for the aircraft 302 when the gross weight and/or wingspan of the aircraft 302 exceeds weight and/or wingspan restrictions for taxiway C-11 and/or taxiway B-11.

Referring again to FIG. 2, in an exemplary embodiment, after determining the next possible taxi paths for the aircraft, the taxi clearance display process 200 continues by displaying the next possible taxi paths or otherwise graphically indicating the next possible taxi paths on the display device (task 214). For example, as shown in FIG. 3, the processing system 106 and/or display system 108 may display a list 306 comprising a graphical representation of the next possible taxi paths for the aircraft 302 on the display device 102. In accordance with some embodiments, the processing system 106 and/or display system 108 may graphically indicate next possible taxi paths on the display device 102, for example, by rendering the taxi paths of the next possible taxi paths using a first visually distinguishable characteristic. Depending on the embodiment, the visually distinguishable characteristic may be realized by using one more of the following: color, hue, tint, brightness, graphically depicted texture or pattern, contrast, transparency, opacity, shading, animation (e.g., strobing, flickering or flashing), and/or other graphical effects.

In an exemplary embodiment, the taxi clearance display process 200 continues by receiving a user input indicative of a desired taxi path and determining whether the user input corresponds to a possible taxi path for the aircraft based on the next possible taxi paths (tasks 216, 218). In an exemplary embodiment, taxi clearance display process 200 is adapted for an audio input (or voice input), wherein an audio input device 104 receives or otherwise senses a sound, converts the sound to a corresponding electrical signal, and provides the electrical signal to the processing system 106. The processing system 106 performs one or more speech recognition techniques and/or algorithms to recognize, verify, or otherwise determine whether the received audio input signal from the audio input device 104 matches or otherwise corresponds to a taxi path of the next possible taxi paths by utilizing the next possible taxi paths as the speech recognition vocabulary (or dictionary). In this regard, by limiting the vocabulary (or dictionary) utilized for the speech recognition techniques and/or algorithms to the next possible taxi paths (e.g., by eliminating the non-plausible taxi paths), the accuracy and response time of the speech recognition is improved. In an exemplary embodiment, the processing system 106 is also configured to correlate letters and their phonetic equivalents (e.g., 'ALPHA'='A', 'BRAVO'='B', and so on), thereby allowing desired taxiways and/or runways to be input using phonetic terminology and/or code words. In alternative embodiments, the processing system 106 may receive the user input indicative of a desired taxi path in response to a user manipulating a user input device 104 (e.g., a knob or cursor control device) to input a desired taxi path. In accordance with one embodiment, the processing system 106 and/or user input device 104 are cooperatively configured to allow a user to manipulate a cursor (or pointer) to select or otherwise indicate the desired taxi path from a list (e.g., list 306). In an exemplary embodiment, if the received user input does not correspond to a taxi path of the next possible taxi paths, the taxi clearance display process 200 is configured to notify the user (e.g., by providing a warning message to the user via display device 102 and/or audio output device 105). Depending upon the embodiment, when the user input does not correspond to a possible taxi path, the taxi clearance display process 200 may be configured to either exit or repeat the steps of receiving input and determining whether the input corresponds to a possible taxi path (e.g., tasks 216, 218).

In an exemplary embodiment, when the received user input corresponds to a taxi path of the next possible taxi paths, the taxi clearance display process 200 continues by graphically indicating the taxi segment corresponding to the selected taxi path (task 220). In this regard, the taxi segment corresponding to the selected taxi path comprises the portion of the current taxi path (or initial taxi path) between the aircraft location and the intersection of the selected taxi path and the current taxi path. In an exemplary embodiment, the taxi clearance display process 200 graphically indicates the taxi segment by displaying and/or rendering the taxi segment corresponding to the selected taxi path using a second visually distinguishable characteristic, that is, a visually distinguishable characteristic different from the first visually distinguishable characteristic described above. As shown in FIG. 3, in response to recognizing a received user input indicative of taxiway B-5 (e.g., 'BRAVO 5') as the desired taxi path, the processing system 106 displays and/or renders the segment 308 of runway 25L (e.g., the initial taxi path) between the current location of the aircraft 302 and the intersection 310 of taxiway B-5 and runway 25L using a visually distinguishable characteristic to indicate B-5 as the selected taxiway, that is, the taxiway which the aircraft 302 should turn onto. In an exemplary embodiment, if the user input includes a particular instruction for the selected taxi path, such as a hold instruction, the taxi clearance display process 200 may graphically indicate the instruction proximate the intersection with the selected taxi path.

In an exemplary embodiment, the taxi clearance display process 200 continues by determining the next possible taxi paths for the aircraft based on the selected taxi path (task 224). In this regard, the next possible taxi paths comprises a plurality of possible taxi paths that corresponds to a subset of the plurality of taxi paths for the identified airport which are capable of being utilized by the aircraft 120 after the aircraft 120 turns on the selected taxi path. In an exemplary embodiment, each possible taxi path of the plurality of possible taxi paths intersects the selected taxi path in the anticipated (or expected) direction of the aircraft's travel along the selected taxi path, that is, the direction of the anticipated (or expected) aircraft heading on the selected taxi path, from the intersection of the selected taxi path and the previous selected taxi path. In this regard, the processing system 106 determines or otherwise identifies an anticipated aircraft location on the selected taxi path as the intersection of the selected taxi path and the initial taxi path. In accordance with one embodiment, the processing system 106 determines or otherwise identifies the anticipated heading for the aircraft 120 based on the relationship between the selected taxi path and the previous taxi path. In this regard, if the selected taxi path extends from the previous taxi path in one direction, the processing system 106 may identify that direction as the anticipated aircraft heading. For example, as shown in FIG. 3, taxiway B-5 extends from the intersection 310 with runway 25L in only one direction, such that the processing system 106 identifies the direction of taxiway B-5 from the intersection 310 with runway 25L as the anticipated aircraft heading. If the selected taxi path extends from the previous taxi path in two directions, the processing system 106 may identify the anticipated aircraft heading along the selected taxi path based on the user input indicating the appropriate direction along the selected taxiway (e.g., "BRAVO 5 RIGHT" or "RIGHT ON BRAVO 5"). Thus, the next possible taxi paths from the selected taxi path do not include taxiways and/or runways which are located in the opposite direction of the aircraft's anticipated travel direction and/or anticipated heading from the aircraft location or taxiways and/or runways that do not intersect, cross, or otherwise connect to the initial taxi path. For example, in the illustrated embodiment of FIG. 3, the processing system 106 may exclude C-5 from the next possible taxi paths for selected taxi path B-5, because C-5 is in the opposite direction of the anticipated travel direction for the aircraft 302 when the aircraft 302 turns onto B-5. In an exemplary embodiment, the plurality of possible taxi paths does not include taxiways and/or runways which the aircraft 120 is physically incapable of utilizing, in a similar manner as described above.

Figure 4:
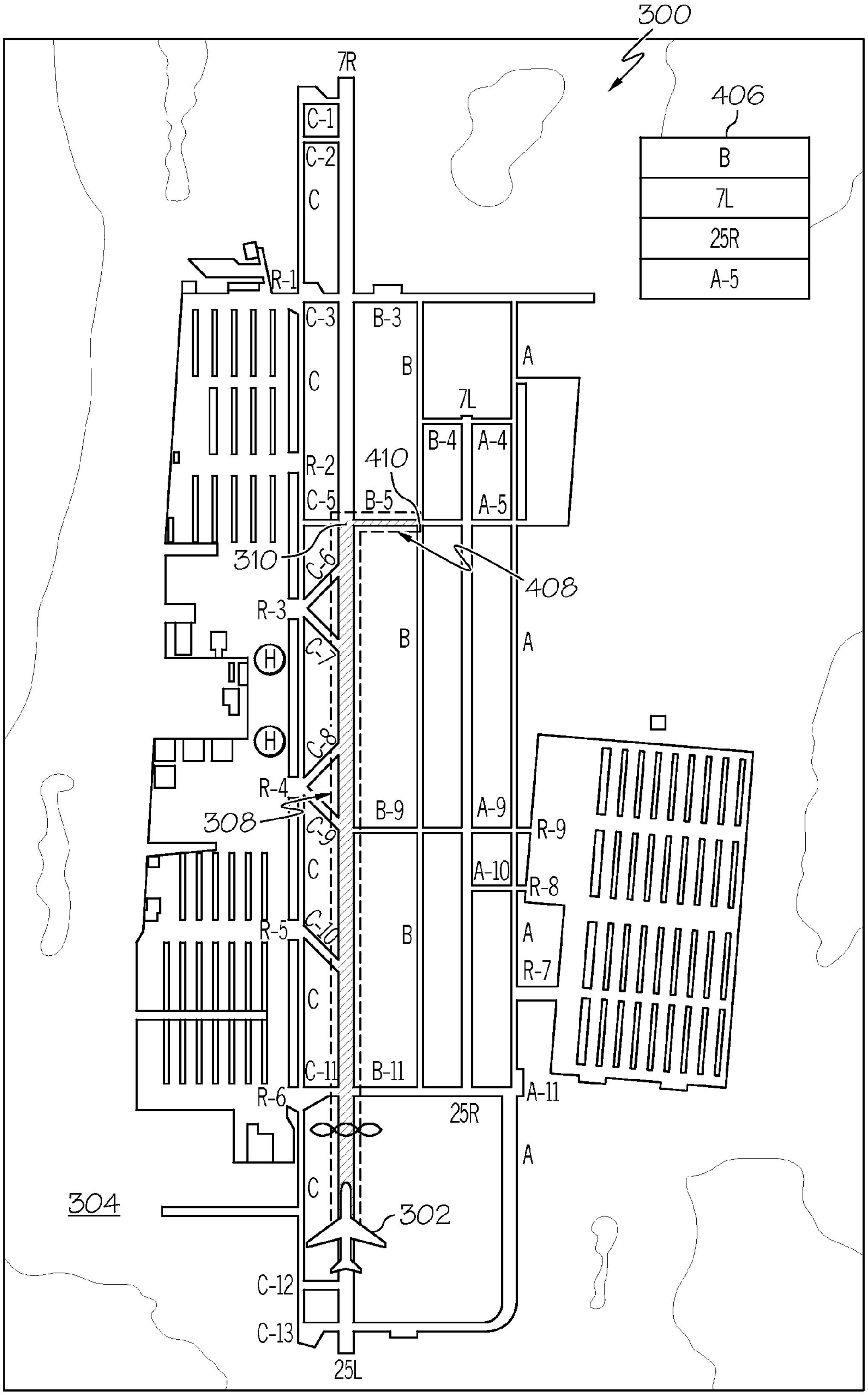
FIG. 4 depicts an exemplary navigational map suitable for use with the taxi clearance display process of FIG. 2 in accordance with one embodiment.
Figure 5:
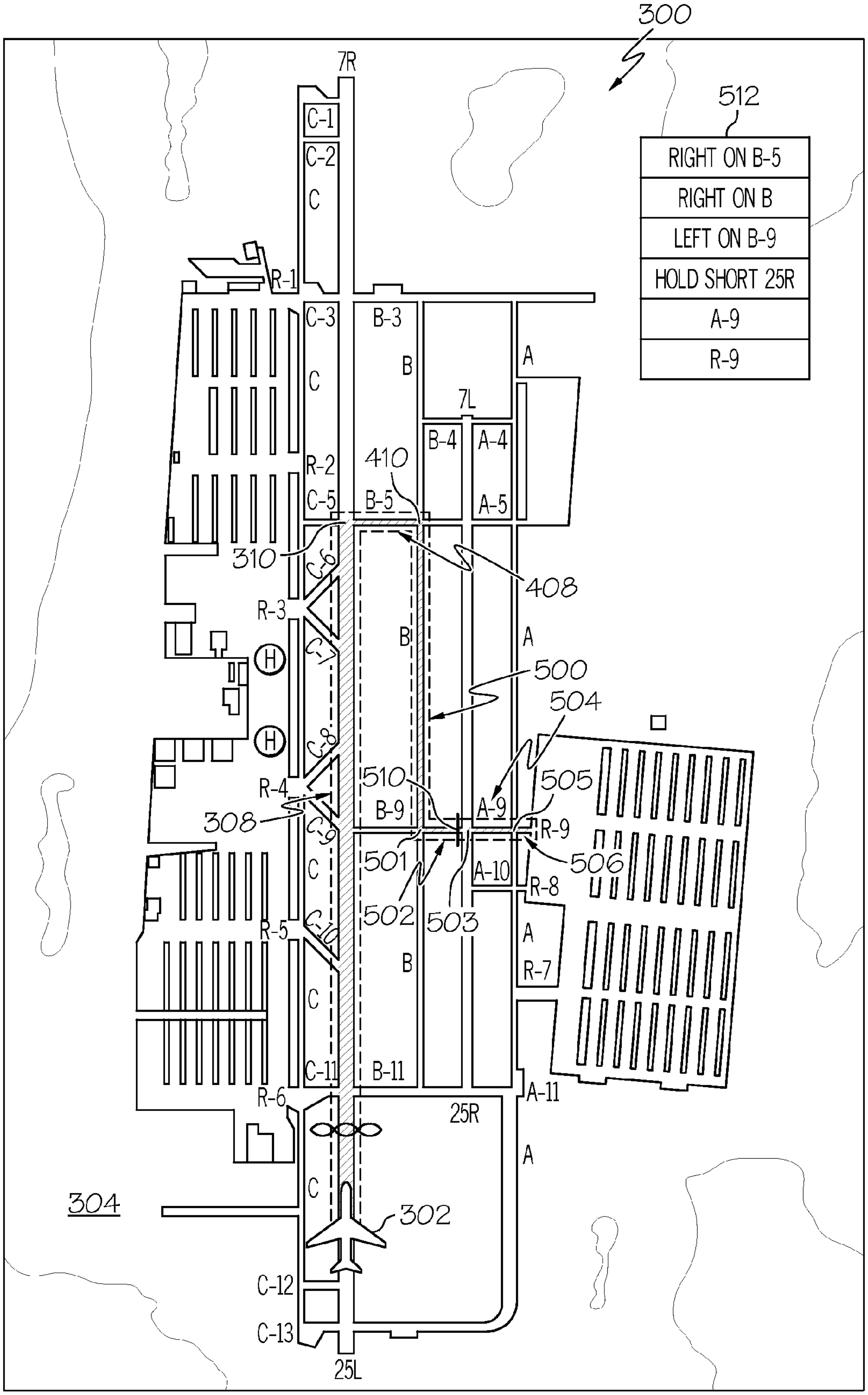
FIG. 5 depicts an exemplary navigational map suitable for use with the taxi clearance display process of FIG. 2 in accordance with one embodiment.

After determining the next possible taxi paths for the aircraft from the selected taxi path, the taxi clearance display process 200 continues by displaying the next possible taxi paths or otherwise graphically indicating the next possible taxi paths from the selected taxi path on the display device (task 214). For example, as shown in FIG. 4, the processing system 106 and/or display system 108 may display a list 406 comprising a graphical representation of the next possible taxi paths for the aircraft 302 on the display device 102 after turning the aircraft 302 onto taxiway B-5 from runway 25L. As described above, the processing system 106 and/or display system 108 may graphically indicate next possible taxi paths for the selected taxi path on the display device 102 using a first visually distinguishable characteristic. As described above, the taxi clearance display process 200 continues by receiving a user input indicative of a desired taxi path, determining whether the user input corresponds to a possible taxi path for the aircraft based on the next possible taxi paths, and graphically indicating the taxi segment corresponding to the selected taxi path when the user input corresponds to a possible taxi path, in a similar manner as described above (tasks 216, 218, 220). As shown in FIG. 4, in response to recognizing a received user input indicative of taxiway B as the desired taxi path, the processing system 106 displays and/or renders the segment 408 of taxiway B-5 between the intersection 310 of taxiway B-5 and runway 25L and the intersection 410 of taxiway B-5 and taxiway B using a second visually distinguishable characteristic to indicate B as the selected taxiway, that is, the taxiway which the aircraft 302 should turn onto from taxiway B-5. The loop defined by tasks 214, 216, 218, 220, 222 repeats until there are no possible taxi paths from a selected taxi path, indicating that complete taxi instructions for taxiing the aircraft from its initial location 302 to a destination location (e.g., a terminal, hangar, gate, or runway) have been received. For example, as shown in FIG. 5, the processing system 106 may receive user input indicative of turning the aircraft left onto taxiway B-9 as the desired taxi path from B, followed by a user input indicative of a hold instruction before crossing runway 25R (e.g. 'HOLD SHORT OF RUNWAY 25R'), followed by a user input indicative of proceeding onto taxiway A-9 from taxiway B-9, followed by a user input indicative of proceeding onto taxiway R-9 from taxiway A-9, at which point, the processing system 106 does not identify any possible taxi paths from taxiway A-9.

In an exemplary embodiment, when there are no next possible taxi paths for a selected taxi path, the taxi clearance display process 200 is configured to prompt a user to confirm the received taxi instructions (task 224). In this regard, a user may review the taxi instructions by viewing the graphically indicated taxi segments on the display device 102 to determine whether the received taxi instructions correspond to the correct and/or desired taxi instructions. If the taxi instructions are not confirmed, the taxi clearance display process 200 may exit, reinitialized, or otherwise repeat the loop defined by tasks 214, 216, 218, 220 and 222 to modify the taxi instructions. In response to a user confirming the received taxi instructions, the taxi clearance display process 200 may display the taxi segments corresponding to the selected taxi paths using a third visually distinguishable characteristic to indicate they have been confirmed or otherwise accepted and provide the selected taxi paths (and any associated instructions) to an appropriate avionics system for providing notification to a user while taxiing the aircraft (task 226). As shown in FIG. 5, in response to confirmation from the user, the processing system 106 displays and/or renders the segment 500 of taxiway B between the intersection 410 of taxiway B-5 and taxiway B and the intersection 501 of taxiway B and taxiway B-9, the segment 502 of taxiway B-9 between the intersection 501 of taxiway B and taxiway B-9 and the intersection 503 of taxiway B-9 and taxiway A-9, the segment 504 of taxiway A-9 between the intersection 503 of taxiway B-9 and taxiway A-9 and the intersection 505 of taxiway A-9 and taxiway R-9, the segment 506 of taxiway R-9, and segments 308 and 408 with a visually distinguishable characteristic indicating the taxi clearance is confirmed and/or accepted. As shown, the taxi clearance display process 200 displays and/or renders a graphical indicator 510 on taxiway B-9 before the intersection 503 with runway 25R to graphically indicate the hold instruction before crossing runway 25R. The processing system 106 may also display a graphical representation 512 of the confirmed taxi instructions which lists the selected taxiways and/or runways. In an exemplary embodiment, the processing system 106 provides the confirmed selected taxi paths to an avionics system 116 which provides an audio and/or visual indication to the user to turn the aircraft 120 onto a selected taxi path upon the aircraft 120 reaching (or coming within a threshold distance of) the intersection of a current taxi path and the selected taxi path. In this regard, as the aircraft 120, 302 travels, the avionics system 116 may provide an auditory indication (e.g., via audio output device 105) or a visual indication (e.g., on display device 102) that the aircraft 120 should turn onto a selected taxi path the location of the aircraft 120, 302 along the current taxi path is proximate the selected taxi path. For example, when the aircraft 120, 302 nears taxiway B-5 on runway 25L, the avionics system 116 may provide an indication to the pilot to turn the aircraft 120, 302 onto taxiway B-5.

One advantage of the systems and/or methods described above is that a user may quickly and accurately input taxi instructions (or a taxi clearance) received from an air traffic controller to the system to provide visual and/or audio indication of the assigned taxi instructions to the user. For example, a pilot may read back the instructions from the air traffic controller, and speech recognition may be utilized to recognize or otherwise identify the taxiways and/or runways that comprise the taxi instructions. By limiting the possible taxiways and/or runways based on the location and heading of the aircraft along a current or previously identified taxiway and/or runway, the response time and accuracy of the speech recognition is improved by virtue of the limited vocabulary (or dictionary) being utilized. Thus, the taxi instructions may be quickly input and displayed on a display device onboard the aircraft, reducing the workload of the pilot and improving the pilot's situational awareness.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for providing information relating to taxiing an aircraft at an airport having a plurality of taxi paths, the method comprising:

identifying, by a processing system, a first aircraft location on a first taxi path of the plurality of taxi paths;

identifying, by the processing system, a first aircraft heading at the first aircraft location;

determining, by the processing system, a first subset of possible taxi paths for selection from the plurality of taxi paths based on the first aircraft location and the first aircraft heading, wherein each respective taxi path of the first subset intersects the first taxi path in the first aircraft heading from the first aircraft location;

limiting, by the processing system, a speech recognition vocabulary using the first subset, resulting in a limited speech recognition vocabulary, wherein each taxi path in the limited speech recognition vocabulary intersects the first taxi path in the first aircraft heading from the first aircraft location;

receiving an audio input;

recognizing, by the processing system, the audio input as a second taxi path of the first subset using the limited speech recognition vocabulary; and providing indication of the second taxi path in response to recognizing the audio input as the second taxi path.

2. The method of claim 1, wherein determining the first subset further comprises:

excluding, from the first subset, one or more taxi paths of the plurality of taxi paths that intersect the first taxi path in a direction opposite the first aircraft heading from the first aircraft location.

3. The method of claim 1, wherein providing indication of the second taxi path comprises displaying a portion of the first taxi path between the first aircraft location and an intersection of the first taxi path and the second taxi path using a visually distinguishable characteristic.

4. The method of claim 1, wherein when the audio input corresponds to a hold instruction for the second taxi path, providing indication of the second taxi path comprises graphically indicating the hold instruction proximate an intersection of the first taxi path and the second taxi path.

5. A method for displaying taxi instructions for taxiing a vehicle at a ground location having a plurality of taxi routes, the method comprising:

obtaining, by a processing system, an initial location of the vehicle along a first taxi route of the plurality of taxi routes;

obtaining, by the processing system, a heading of the vehicle along the first taxi route;

identifying, by the processing a set of possible taxi routes from the plurality of taxi routes based on the heading of the vehicle, the set of possible taxi routes comprising a subset of the plurality of taxi routes, wherein each possible taxi route intersects the first taxi route in front of the initial location;

receiving an audio input indicative of a desired taxi route;

recognizing, by the processing system, the audio input as a second taxi route from among the set of possible taxi routes as the desired taxi route based on the audio input using a recognition vocabulary limited to the set of possible taxi routes; and in response to recognizing the second taxi route, graphically indicating the second taxi route on a display device associated with the vehicle.

6. The method of claim 5, wherein identifying the set of possible taxi routes further comprises:

excluding, from the set of possible taxi routes, one or more taxi routes of the plurality of taxi routes that intersect the first taxi route in a direction opposite the heading of the vehicle.

7. A system for an aircraft comprising:

a data storage element, the data storage element maintaining information pertaining to a plurality of taxi paths for an airport;

a display device;

an audio input device capable of receiving an audio input indicative of a desired taxi path; and a processing system coupled to the data storage element, the display device, and the audio input device, wherein the processing system is configured to:

obtain a first aircraft location on a first taxi path of the plurality of taxi paths;

obtain a first aircraft heading along the first taxi path at the first aircraft location;

determine a first subset of possible taxi paths for selection from the plurality of taxi paths based on the first aircraft heading and the first aircraft location, wherein each taxi path of the first subset intersects the first taxi path in the first aircraft heading from the first aircraft location;

recognize the audio input as a second taxi path from among the first subset based on the audio input utilizing a recognition vocabulary limited to the first subset; and graphically indicate, on the display device, a first taxi segment corresponding to at least a portion first taxi path between the first aircraft location and an intersection of the first taxi path and the second taxi path.

8. The system of claim 7, further comprising an avionics system onboard the aircraft and coupled to the processing system, wherein the processing system is configured to provide the second taxi path to the avionics system, the avionics system being configured to notify a user when a location of the aircraft along the first taxi path is proximate to the second taxi path.

9. The method of claim 1, further comprising displaying, on a display device onboard the aircraft, a graphical representation of the first subset.

10. The method of claim 1, wherein determining the first subset further comprises determining the second taxi path intersects the first taxi path at an intersection location in the first aircraft heading from the first aircraft location.

11. The method of claim 1, wherein determining the first subset further comprises:

excluding, from the first subset, one or more taxi paths that intersect the first taxi path based at least in part on an operating characteristic of the aircraft.

12. The method of claim 11, wherein excluding the one or more taxi paths comprises:

excluding a third taxi path of the plurality of taxi paths based at least in part on a velocity of the aircraft and a distance between the first aircraft location and an intersection of the first taxi path and the third taxi path.

13. The method of claim 11, wherein excluding the one or more taxi paths comprises:

excluding a third taxi path of the plurality of taxi paths based at least in part on a turning radius of the aircraft and an angle of intersection between the third taxi path and the first taxi path.

14. The method of claim 1, wherein providing indication of the second taxi path comprises indicating when a location of the aircraft along the first taxi path is proximate the second taxi path.

15. The method of claim 3, further comprising:

determining an anticipated heading of the aircraft along the second taxi path;

determining a second subset of possible taxi paths for selection from the plurality of taxi paths based on the anticipated heading of the aircraft along the second taxi path, wherein each respective taxi path of the second subset intersects the second taxi path in the anticipated heading of the aircraft from an intersection of the first taxi path and the second taxi path;

limiting the speech recognition vocabulary using the second subset, resulting in a second limited speech recognition vocabulary, wherein each taxi path in the second limited speech recognition vocabulary intersects the second taxi path in the anticipated heading from the intersection of the first taxi path and the second taxi path;

receiving a second audio input; and recognizing the second audio input as a third taxi path of the second subset using the second limited speech recognition vocabulary; and displaying a portion of the second taxi path between the first taxi path and the third taxi path using the visually distinguishable characteristic in response to recognizing the second audio input as the third taxi path.

16. The method of claim 5, further comprising:

determining an anticipated heading of the vehicle along the second taxi route;

identifying a second set of possible taxi routes from the plurality of taxi routes, wherein each possible taxi route of the second set intersects the second taxi route in the anticipated heading from an intersection of the first taxi route and the second taxi route;

receiving a second audio input indicative of a second desired taxi route;

recognizing the second audio input as a third taxi route from among the second set of possible taxi routes as the second desired taxi route based on the second audio input using a second recognition vocabulary limited to the second set of possible taxi routes; and in response to recognizing the third taxi route, graphically indicating the third taxi route on the display device.

17. A method for providing information relating to taxiing an aircraft at an airport having a plurality of taxi paths, the method comprising:

identifying, by a processing system, an aircraft location on a first taxi path of the plurality of taxi paths;

identifying, by the processing system, an aircraft heading at the aircraft location;

determining, by the processing system, a first subset of possible taxi paths for selection from the plurality of taxi paths based on the aircraft location and the aircraft heading, wherein each respective taxi path of the first subset intersects the first taxi path in the aircraft heading from the aircraft location; and limiting a speech recognition vocabulary using the first subset, resulting in a limited speech recognition vocabulary utilized by the processing system to perform a speech recognition algorithm to determine whether a received audio input signal from an audio input device corresponds to a second taxi path of the first subset, wherein each taxi path in the limited speech recognition vocabulary intersects the first taxi path in the aircraft heading from the aircraft location; and providing indication of the second taxi path in response to recognizing the audio input as the second taxi path.

* * * * *